(12) United States Patent
Zhou et al.

(10) Patent No.: US 12,438,474 B2
(45) Date of Patent: Oct. 7, 2025

(54) AC-DC-AC CONVERTER FOR MOTOR DRIVE APPLICATIONS

(71) Applicant: GE ENERGY POWER CONVERSION TECHNOLOGY LIMITED, Warwicksire (GB)

(72) Inventors: Zhi Zhou, Bethlehem, NY (US); Duro Basic, Villebon-sur-yvette (FR)

(73) Assignee: GE ENERGY POWER CONVERSION TECHNOLOGY LIMITED, Warwichsire (GB)

(*) Notice: Subject to any disclaimer, the term of this patent is extended or adjusted under 35 U.S.C. 154(b) by 300 days.

(21) Appl. No.: 18/188,725

(22) Filed: Mar. 23, 2023

(65) Prior Publication Data

US 2024/0322708 A1    Sep. 26, 2024

(51) Int. Cl.
  *H02M 7/483*   (2007.01)
  *H02M 1/00*    (2007.01)
  *H02M 1/36*    (2007.01)

(52) U.S. Cl.
  CPC ....... *H02M 7/4835* (2021.05); *H02M 1/0025* (2021.05); *H02M 1/36* (2013.01)

(58) Field of Classification Search
  CPC .... H02M 7/4835; H02M 1/0025; H02M 1/36; H02M 1/0095; H02M 1/15; H02M 5/4585; H02M 7/217; H02M 7/487

USPC .......................... 318/445, 762, 803
See application file for complete search history.

(56) References Cited

U.S. PATENT DOCUMENTS

| | | | |
|---|---|---|---|
| 6,815,100 B2 * | 11/2004 | Aoyagi | H01M 8/241 |
| | | | 429/429 |
| 8,674,647 B2 * | 3/2014 | Iwaji | B60L 15/08 |
| | | | 318/599 |
| 9,379,658 B2 * | 6/2016 | Yoo | H02P 27/047 |
| 9,515,568 B2 | 12/2016 | Zhang et al. | |
| 9,673,743 B1 * | 6/2017 | Billson | H02P 23/26 |
| 10,075,056 B2 | 9/2018 | Zhang et al. | |

OTHER PUBLICATIONS

Wang et al. "Review on low-frequency ripple suppression methods for MMCs for medium-voltage drive applications," 2018, IET Power Electronics, vol. 11, No. 15, pp. 2403-2414. https://doi.org/10.1049/iet-pel.2018.5657.

* cited by examiner

*Primary Examiner* — David Luo
(74) *Attorney, Agent, or Firm* — Wood IP, LLC; Theodore A. Wood

(57) ABSTRACT

AC-DC-AC converter for delivering power to an electric motor from a power source is presented. The AC-DC-AC converter comprises a front-end converter and a motor-end converter connected through a DC link, the DC link voltage being generated and controlled by the front-end converter.

29 Claims, 15 Drawing Sheets

AC-DC-AC CONVERTER FOR MOTOR DRIVE APPLICATIONS

FIELD OF THE INVENTION

The invention relates to modular multilevel converters and more precisely, to such modular multilevel converters powering up an electric motor, notably during startup.

BACKGROUND OF THE INVENTION

MMC-based motor drive is capable of powering and driving different kind of motors in an efficient manner. However, such motor drives present issues when a torque has to be generated, in particular during motor startup. Because of this challenge, MMC-based motor drive has been limited to low torque applications, like fans or pumps.

"Review on low-frequency ripple suppression methods for MMCs for medium-voltage drive applications," IET Power Electron., 2018, Vol. 11, Issue 15, pp. 2403-2414 describes the challenges of an MMC-based motor drive for low frequency operation during motor startup. One of those challenges resides in the voltage ripple appearing in the MMC submodules.

The submodule (SM) capacitor voltage ripple is proportional to the DC link voltage and inversely proportional to the motor frequency or speed.

During motor startup, the frequency/speed is low while the motor torque is constant. If the DC link voltage remains or is the same as the voltage in steady state operation, the voltage ripple becomes large and cannot be tolerated during startup.

In order to reduce the voltage ripple during motor startup, a number of methods have been reviewed and summarized in prior arts, including high frequency harmonics injections and variable DC link voltage. The harmonics injections are usually complicated with limited benefit. The variable DC link voltage method is, however, more effective and relatively easier to implement with a right topology.

In prior arts, the variable DC link voltage was not generated by the front-end converter, it was rather accomplished by adding an extra external DC chopper at the DC link in line with the motor-end and front-end converters. A particular interest of this invention is that if the DC link voltage Vdc is adjusted with respect to frequency to maintain a constant ratio of Vdc/f, the voltage ripple will be kept low and constant. This is especially important in low frequency operation such as a motor startup, overcoming the issue, challenges and limitations of the traditional MMC for motor drive applications.

Despite the solution for indirect AC-DC-AC conversion for motor drive applications provided by prior arts, there is a need for an improved alternative in terms of performance and cost. There is also a need for optimized topologies of both the front-end and the motor-end converters being able to satisfy both steady state and startup operation.

SUMMARY OF THE INVENTION

An object of the invention is an AC-DC-AC converter for delivering power to an electric motor from a power source, the AC-DC-AC converter comprising a front-end converter and a motor-end converter connected through a DC link, the front-end converter operating so that the DC link voltage is constant.

Yet another object of the invention is an AC-DC-AC converter for delivering power to an electric motor from a power source, the AC-DC-AC converter comprising a front-end converter and a motor-end converter connected through a DC link, the front-end converter being a hybrid modular multilevel rectifier, the motor-end converter being a hybrid multilevel converter, the hybrid modular multilevel rectifier operating so that the DC link voltage is constant, the motor-end converter operating in a modular multilevel converter mode performing the functions of a three-level DC/DC chopper plus an MMC during the motor startup.

Depending on variants of this object, the chain link DC voltage of the motor-end converter is controlled as a function of the motor frequency, motor speed or motor AC voltage.

Another object of the invention is an AC-DC-AC converter for delivering power to an electric motor from a power source, the AC-DC-AC converter comprising a front-end converter and a motor-end converter connected through a DC link, the front-end converter being a hybrid modular multilevel rectifier, the motor-end converter being a hybrid multilevel converter, the hybrid modular multilevel rectifier operating so that the DC link voltage is constant, the motor-end converter operating in a modular multilevel converter mode performing the functions of a two-level DC/DC chopper plus an MMC during the motor startup.

Again, depending on variants of this object, the chain link DC voltage of the motor-end converter is controlled as a function of the motor frequency, motor speed or motor AC voltage.

The invention is also aimed toward different embodiments of a hybrid modular multilevel rectifier.

A first embodiment of a hybrid modular multilevel rectifier comprises at least one leg, each leg being connected to an AC connection and to three DC connections, each leg comprises at least four diodes of a plurality of diodes and two branches, the first branch comprising at least one submodule of a plurality of submodules connected in series, the first branch being connected to a first diode anode and to a second diode cathode by a first submodule and to the AC connection, the second branch comprising at least one submodule of a plurality of submodules connected in series, the second branch being connected to the third diode anode and to the fourth diode cathode by a first submodule and to the AC connection, the first diode cathode being connected to the first DC connection, the second diode anode and the third diode cathode being connected to the second DC connection, the fourth diode anode being connected to the third DC connection.

A second embodiment of a hybrid modular multilevel rectifier comprises at least one leg, each leg being connected to an AC connection and to three DC connections, each leg comprises at least four diodes of a plurality of diodes and two branches, each branch comprising at least one submodule of a plurality of submodules connected in series, the AC connection being connected to a first diode anode and to a second diode cathode, the first branch comprising at least one submodule of a plurality of submodules connected in series, the first branch being connected by a submodule to the first diode cathode and to a third diode anode, the second branch comprising at least one submodule of a plurality of submodules connected in series, the second branch being connected by a submodule to a second diode anode and to a fourth diode cathode, the third diode cathode being connected to the first DC connection, the first branch and the second branch being connected to the second DC connection, the fourth diode anode being connected to the third DC connection.

A third embodiment of a hybrid modular multilevel rectifier comprises at least one leg, each leg being connected to an AC connection and to three DC connections, each leg comprises at least four diodes of a plurality of diodes and two branches, each branch comprising at least one submodules of a plurality of submodules in series, the AC connection is connected to a first diode anode and to a second diode cathode, the first branch comprises at least one submodule of a plurality of submodules connected in series, the first branch is connected by a submodule to the first DC connection and to the cathodes of the first diode and a third diode, the second branch comprises at least one submodule of a plurality of submodules connected in series, the second branch being connected by a submodule to the third DC connection and to the anodes of the second diode and a fourth diode, the third diode anode and the fourth diode cathode are connected to the second DC connection.

In a variant, each branch of a hybrid modular multilevel rectifier comprises an inductor connected on one-end in series with the submodules, and on the-other-end connected respectively with the AC connection, the second DC connection, and with the diodes the branch is connected to.

Other embodiments of the hybrid modular multilevel rectifier variants comprise a different number of legs. In other words, in other embodiments, a hybrid modular multilevel rectifier variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

The invention is also aimed toward different embodiments of a hybrid modular multilevel converter.

In a first embodiment, the hybrid modular multilevel converter comprises at least one leg, each leg being connected to an AC connection and to three DC connections, each leg comprising at least four controllable switches of a plurality of controllable switches and two branches, a first end of a first controllable switch connected to a first DC connection, a first end of a second controllable switch connected to a second end of the first controllable switch, the second end of the second controllable switch connected to a second DC connection, a first end of a third controllable switch connected to a second end of the second controllable switch and to the second DC connection, a first end of a fourth controllable switch connected to a second end of the third controllable switch, a second end of the fourth controllable switch is connected to the third DC connection, the first branch comprising at least one submodule of a plurality of submodules connected in series, the first branch being connected by a first submodule to a second end of the first controllable switch and to a first end of the second controllable switch, the first branch being connected to the AC connection, the second branch comprising at least one submodule of a plurality of submodules connected in series, the second branch being connected by a first submodule to a second end of the third controllable switch and to a first end of the fourth controllable switch, the second branch being connected to the AC connection.

In a preferred mode of realization of the first embodiment, the submodules are controllable switches in a full-bridge configuration or hybrid configuration for applications where the DC link voltage is less than or equal to the peak/maximum AC phase voltage; or in a half-bridge configuration for applications where the DC link voltage is greater than the peak/maximum AC phase voltage.

In a second embodiment, the hybrid modular multilevel converter comprises at least one leg, each leg being connected to an AC connection and to three DC connections, each leg comprising at least two pairs of controllable switches of a plurality of pairs of controllable switches connected in series with opposite polarities, at least two controllable switches of a plurality of controllable switches connected in series, a first end of a first controllable switch of the first pair of controllable switches connected to a first DC connection, a second end of a second controllable switch of the first pair of controllable switches is connected to the second end of the first controllable switch of the first pair of controllable switches, a first end of a third controllable switch is connected to the first end of the second controllable switch of the first pair of controllable switches, the second end of the third controllable switch is connected to the AC connection, a first end of a fourth controllable switch of the second pair of controllable switches is connected to a third DC connection, a second end of a fifth controllable switch of the second pair of controllable switches is connected to a second end of the fourth controllable switch of the second pair of controllable switches, a second end of a sixth controllable switch is connected to the first end of the fifth controllable switch of the second pair of controllable switches, a first end of the sixth controllable switch is connected to the AC connection, the first branch comprising at least one submodule of a plurality of submodules connected in series, the first branch being connected by a first submodule to the first end of the second controllable switch of the first pair of controllable switches and to the first end of the third controllable switch, the first branch being connected to the second DC connection, the second branch comprising at least one submodule of a plurality of submodules connected in series, the second branch being connected by a first submodule to the first end of the fifth controllable switch of the second pair of controllable switches and to the second end of the sixth controllable switch, the second branch being connected to the second DC connection.

In a preferred mode of realization of the second embodiment, the submodules are controllable switches in a half-bridge configuration.

In a third embodiment, the hybrid modular multilevel converter comprises at least one leg, each leg being connected to an AC connection and to three DC connections, each leg comprises at least four controllable switches of a plurality of controllable switches and two branches, a first branch comprising at least one submodule of a plurality of submodules connected in series, the first branch being connected to the first DC connection, a first submodule of the first branch being connected to a first end of a first controllable switch and to a first end of a third controllable switch, a second branch comprising at least one submodule of a plurality of submodules connected in series, the second branch being connected to the third DC connection, a first submodule of the second branch being connected to the second end of the second controllable switch and to the second end of the fourth controllable switch, the second end of the first controllable switch and the first end of the second controllable switch being connected to the second DC connection, the second end of the third controllable switch and the first end of the fourth controllable switch being connected to the AC connection.

In a preferred mode of realization of the third embodiment, the submodules are controllable switches in a full-bridge configuration or hybrid configuration for applications where the DC link voltage is less than or equal to the peak/maximum AC phase voltage; or in a half-bridge configuration for applications where the DC link voltage is greater than the peak/maximum AC phase voltage.

In a variant, an inductor is comprised in each branch of the second and third embodiments of a hybrid modular multilevel converter and of the second and third embodiments of a hybrid modular multilevel rectifier, the inductor being connected between a submodule of the branch and the DC connection the branch is connected to.

In another variant, an inductor is comprised in each branch of the first embodiment of a hybrid modular multilevel converter and of the first embodiment of a hybrid modular multilevel rectifier, the inductor being connected between a submodule of the branch and the AC connection the branch is connected to.

Other embodiments of the hybrid modular multilevel converter variants comprise a different number of legs. In other words, in other embodiments, a hybrid modular multilevel converter variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The following shows preferred examples of the present description. Note that the present description is not limited to the following configurations.

The invention utilizes and optimizes the combined use of a hybrid modular multi-level rectifier (HMMR) as the front-end and a hybrid modular multi-level converter (HMMC) as the motor-end converter.

The front-end rectifier of the back-to-back HMMR-HMMC based indirect AC-DC-AC topology is effective in generating a constant DC link voltage while providing power/current to the motor in steady state operation and during startup. More importantly for this invention, the motor-end HMMC motor drive is able to operate in an MMC plus DC/DC chopper mode during motor startup, in order to provide a variable chain link (CL) DC voltage of the HMMC of the motor drive to maintain a constant ratio of VCL/f in order to keep a low and constant voltage ripple on the SM capacitors. This variable CL DC voltage is achieved without an extra external DC chopper as is the case in the prior-art. In addition, there are two DC/DC chopper modes available, i.e., 2-level or 3-level, all accomplished with the embedded hardware (semiconductor switches) within the motor-end HMMC motor drive.

Figure 1:
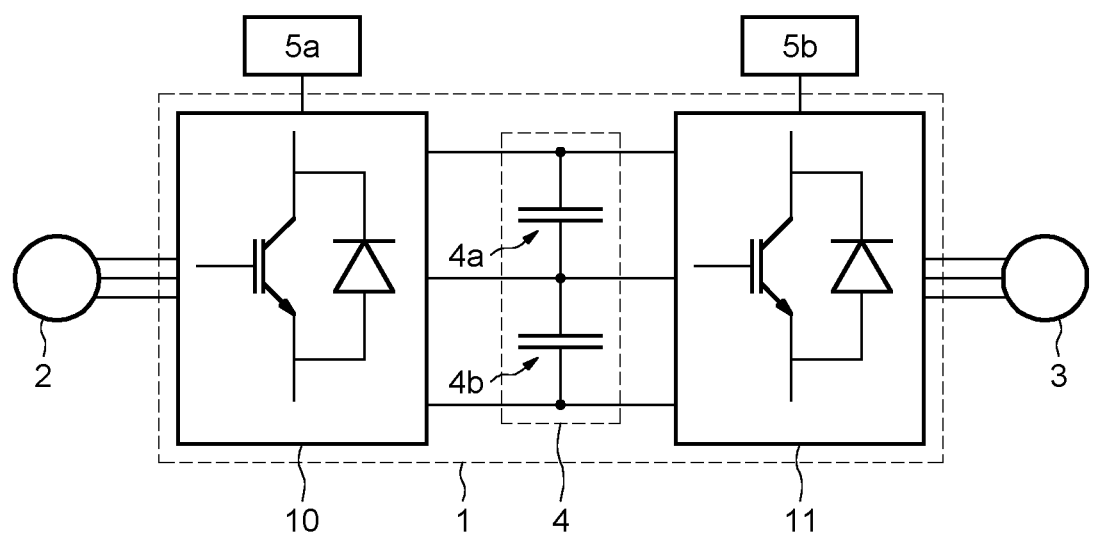
FIG. 1 illustrates an embodiment of the invention employing a hybrid modular multilevel rectifier (HMMR) as a front-end converter and a hybrid modular multilevel converter (HMMC) as a motor-end converter.

FIG. 1 illustrates a first embodiment of the invention wherein the AC-DC-AC converter 1 feeding power to a motor 3 from an AC source 2 comprises a front-end converter 10 being a hybrid multilevel modular rectifier HMMR and a motor-end converter 11 being a hybrid multilevel modular converter HMMC. The output of the front-end converter 10 is connected to the input of the motor-end converter 11 through a DC link 4. The DC link 4 comprises two capacitances 4a,4b connected in series, each simultaneously connected to a pair of DC connections of the front-end hybrid modular multilevel rectifier and the motor-end hybrid modular multilevel converter.

The AC-DC-AC converter 1 comprises a first controller 5a for controlling and switching of the controllable switches comprised within the front-end converter 10 and a second controller 5b for controlling and switching of the controllable switches comprised within the motor-end converter 11. Depending on the embodiments, the first controller 5a and the second controller 5b are independent, directly or indirectly linked, or integrated within a same control unit.

Figure 2:
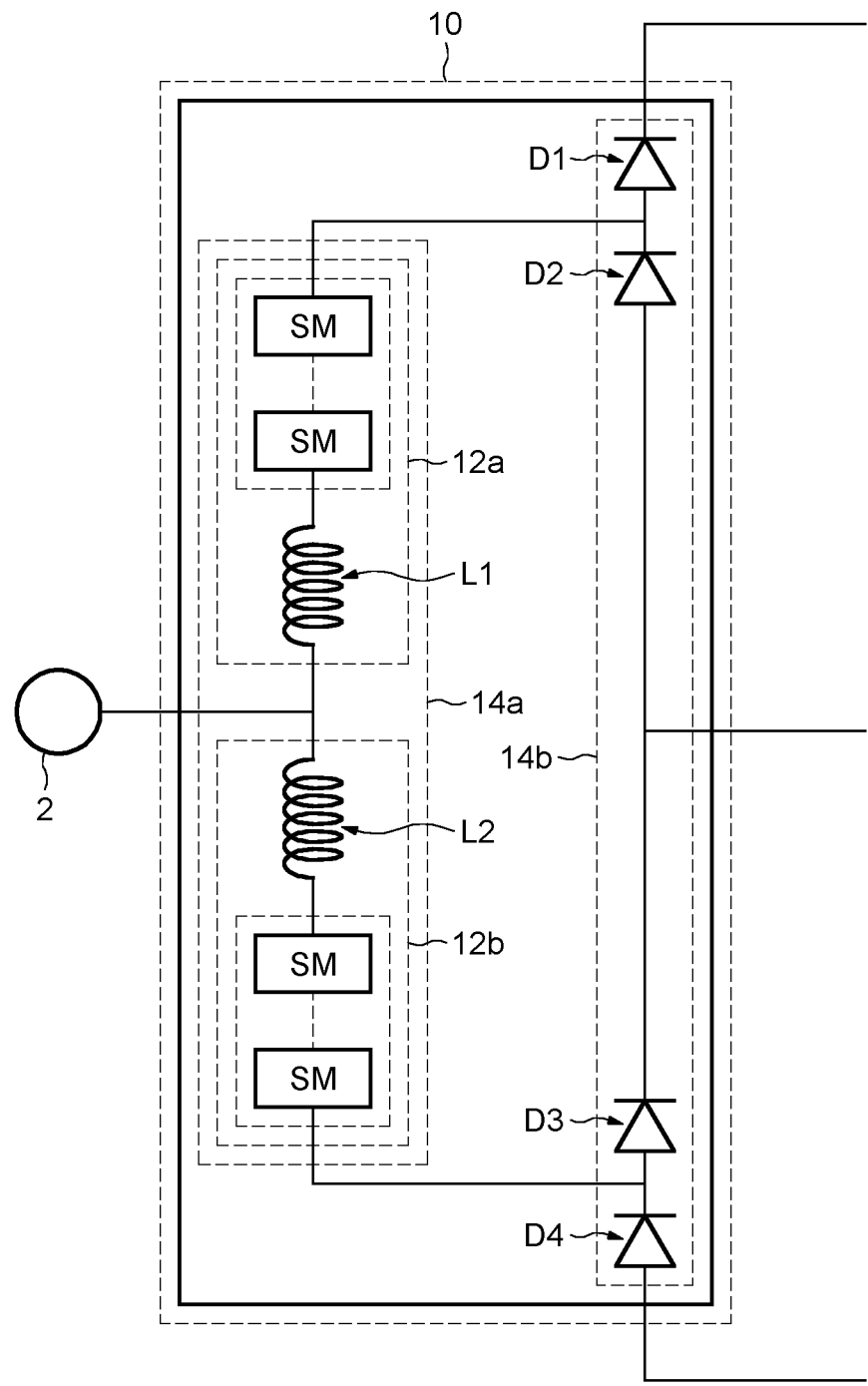
FIG. 2 illustrates a first hybrid modular multilevel rectifier variant.
Figure 3:
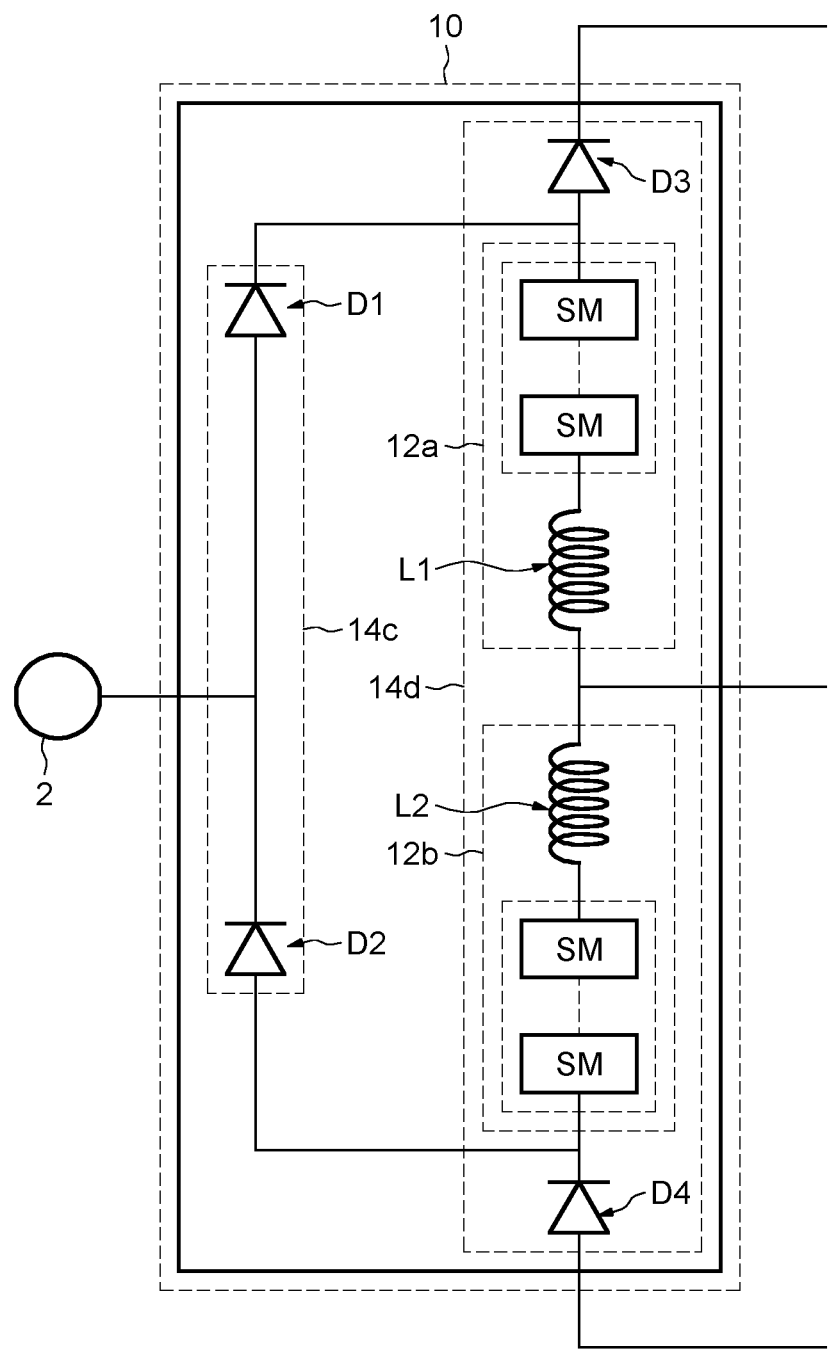
FIG. 3 illustrates a second hybrid modular multilevel rectifier variant.
Figure 4:
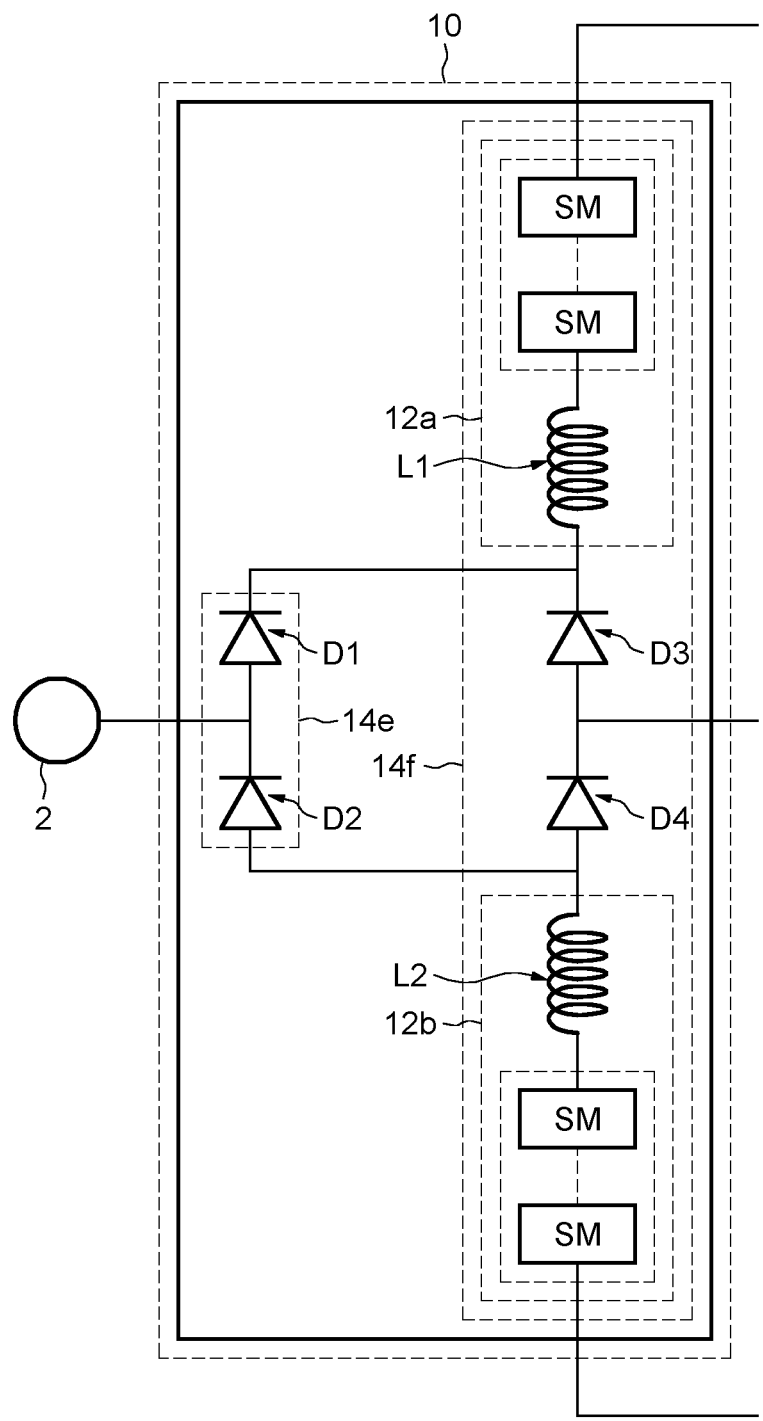
FIG. 4 illustrates a third hybrid modular multilevel rectifier variant.

The hybrid multilevel modular rectifier (HMMR) exists as three different variants, illustrated in FIG. 2, FIG. 3 and FIG. 4 and can be used as a front-end converter 10 in the present embodiment.

The first hybrid modular multilevel rectifier variant and the second hybrid modular multilevel rectifier variant are best suited for applications where the DC link voltage is greater than the instantaneous max supply/source AC phase voltage. The third hybrid modular multilevel rectifier variant is best suited for applications where the DC link voltage is lower than or equal to the instantaneous max supply/source AC phase voltage.

Three HMMC variants described below in relation with FIG. 5, FIG. 6 and FIG. 7 can be used as a motor-end converter 11 in the present embodiment.

The first hybrid modular multilevel rectifier (HMMR) variant illustrated in FIG. 2 comprises at least one leg 10 connected to an AC connection and to three DC connections. Each leg 10 comprises a first string 14a comprising at least one submodule SM of a plurality of submodules and two inductors L1, L2 and a second string 14b comprising at least four diodes D1, D2, D3, D4 of a plurality of diodes in series.

The first string 14a comprises two branches 12a, 12b, each branch of the first string 14a comprising an inductor L1, L2 and at least one submodule SM of a plurality of submodules in series.

The first branch 12a of the first string 14a comprises the first inductor L1 and is connected to the second string 14b by a first submodule SM and to the AC connection by the first inductor L1.

The second branch 12b of the first string 14a comprises the second inductor L2 and is connected to the second string 14b by a first submodule SM and to the AC connection by the second inductor L2.

In the second string 14b, the cathode of the first diode D1 is connected to a first DC connection.

The first diode D1 anode and the second diode D2 cathode are connected to the first string 14a, in particular to a submodule SM of the first branch 12a of the first string 14a.

The anode of the second diode D2 and the cathode of the third diode are connected to a second DC connection.

The third diode D3 anode and the fourth diode D4 cathode are connected to the first string 14a, in particular to a submodule SM of the second branch 12b of the first string 14a.

The anode of the fourth diode is connected to a third DC connection.

Other embodiments of the first hybrid modular multilevel rectifier variant comprise a different number of legs. In other words, in other embodiments, a first hybrid modular multilevel rectifier variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

Figure 8:
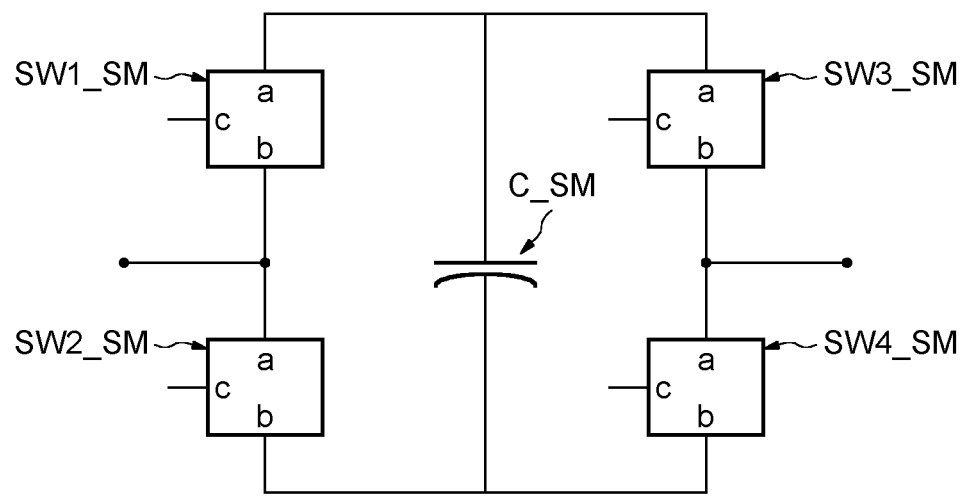
FIG. 8 illustrates a full-bridge submodule variant with controllable switches.
Figure 9:
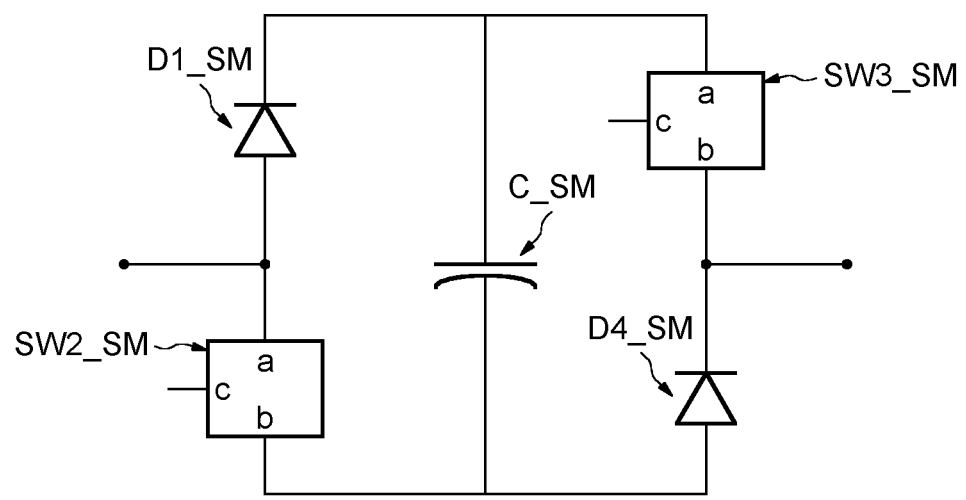
FIG. 9 illustrates a hybrid full-bridge submodule variant with controllable switches.
Figure 10:
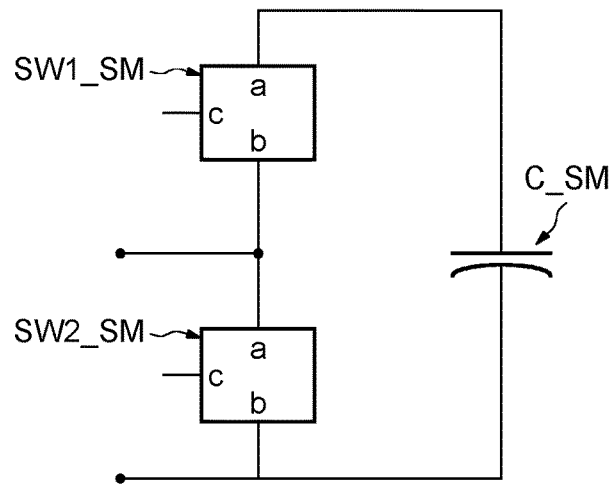
FIG. 10 illustrates a half-bridge submodule variant with controllable switches.

In each branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, half-bridge submodules are used for applications where the DC link voltage is greater than the peak/maximum AC phase voltage.

The second HMMR variant illustrated in FIG. 3 comprises at least one leg 10, each leg being connected to an AC connection and to three DC connections.

Each leg 10 comprises a first string 14c comprising at least two diodes D1, D2 of a plurality of diodes in series and a second string 14d comprising at least two diodes D3, D4 of a plurality of diodes in series, at least one submodule SM of a plurality of submodules and two inductors L1, L2 one in each of the two branches 12a, 12b of the second string 14d. Each branch 12a, 12b comprises an inductor L1, L2 and at least one submodule SM in series of the second string 14d.

The first string 14c comprises at least a first diode D1 of a plurality of diodes connected in series. The first diode D1 of the first string 14c is connected by its anode to the AC connection and by its cathode to the second string 14d. The first string 14c also comprises at least a second diode D2 of a plurality of diodes connected in series. The second diode D2 of the first string 14c is connected by its cathode to the AC connection and by its anode to the second string 14d.

In the second string 14d, a first DC connection is connected to the cathode of a third diode D3 of a plurality of diodes connected in series. The anode of the third diode D3 is connected to submodule SM of the first branch 12a and to the first string 14c. More precisely, the anode of the third diode D3 is connected to the cathode of the first diode D1 of the first string 14c.

The first branch inductor L1 and the second branch inductor L2 of the second string 14d are connected together to a second DC connection.

A third DC connection is connected to the anode of the fourth diode D4 of a plurality of diodes connected in series. The cathode of the fourth diode D4 is connected to a submodule SM of the second branch 12b of the second string 14d and to the first string 14c. More precisely, the cathode of the fourth diode D4 is connected to the anode of the second diode D2 of the first string 14c.

Other embodiments of the second hybrid modular multilevel rectifier variant comprise a different number of legs. In other words, in other embodiments, a second hybrid modular multilevel rectifier variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

In each branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, the submodules are half-bridge submodules used for applications where the DC link voltage is greater than the peak/maximum AC phase voltage.

The third HMMR variant illustrated in FIG. 4 comprises at least one leg 10, each leg being connected to an AC connection and to three DC connections.

Each leg comprises a first string 14e comprising at least two diodes D1, D2 of a plurality of diodes in series, and a second string 14f comprising at least two diodes D3, D4 of a plurality of diodes in series, and at least one submodule SM of a plurality of submodules in series and two inductors L1, L2 each in one of the two branches 12a, 12b of the second string 14f. Each branch 12a, 12b of the second string 14f comprises an inductor L1, L2 and at least one submodule SM in series.

In the first string 14e, the AC connection is connected to the first diode D1 anode and to the second diode D2 cathode. The first diode D1 cathode and the second diode D2 anode are both separately connected to the second string 14f.

In the second string 14f, the first branch 12a comprising the first inductor L1 is connected by a submodule SM to a first DC connection and by the first inductor L1 to the cathode of third diode D3 and to the first string 14e. More precisely, the first inductor L1 and the cathode of third diode D3 are connected to the cathode of the first diode D1.

The second branch 12b of the second string 14f comprising the second inductor L2 is connected by a submodule SM to a third DC connection and by the second inductor L2 to the anode of fourth diode D4 of the second string 14f and to the first string 14e. More precisely, the second inductor L2 and the anode of fourth diode D4 of the second string 14f are connected to the anode of the second diode D2 of the second string 14f.

The anode of the third diode D3 and the cathode of the diode D4 in the second string 14f are connected together to a second DC connection.

Other embodiments of the third hybrid modular multilevel rectifier variant comprise a different number of legs. In other words, in other embodiments, a third hybrid modular multilevel rectifier variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

In each branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, the submodules are full-bridge or hybrid submodules used for applications where the DC link voltage is less than or equal to the peak/maximum AC phase voltage.

Figure 5:
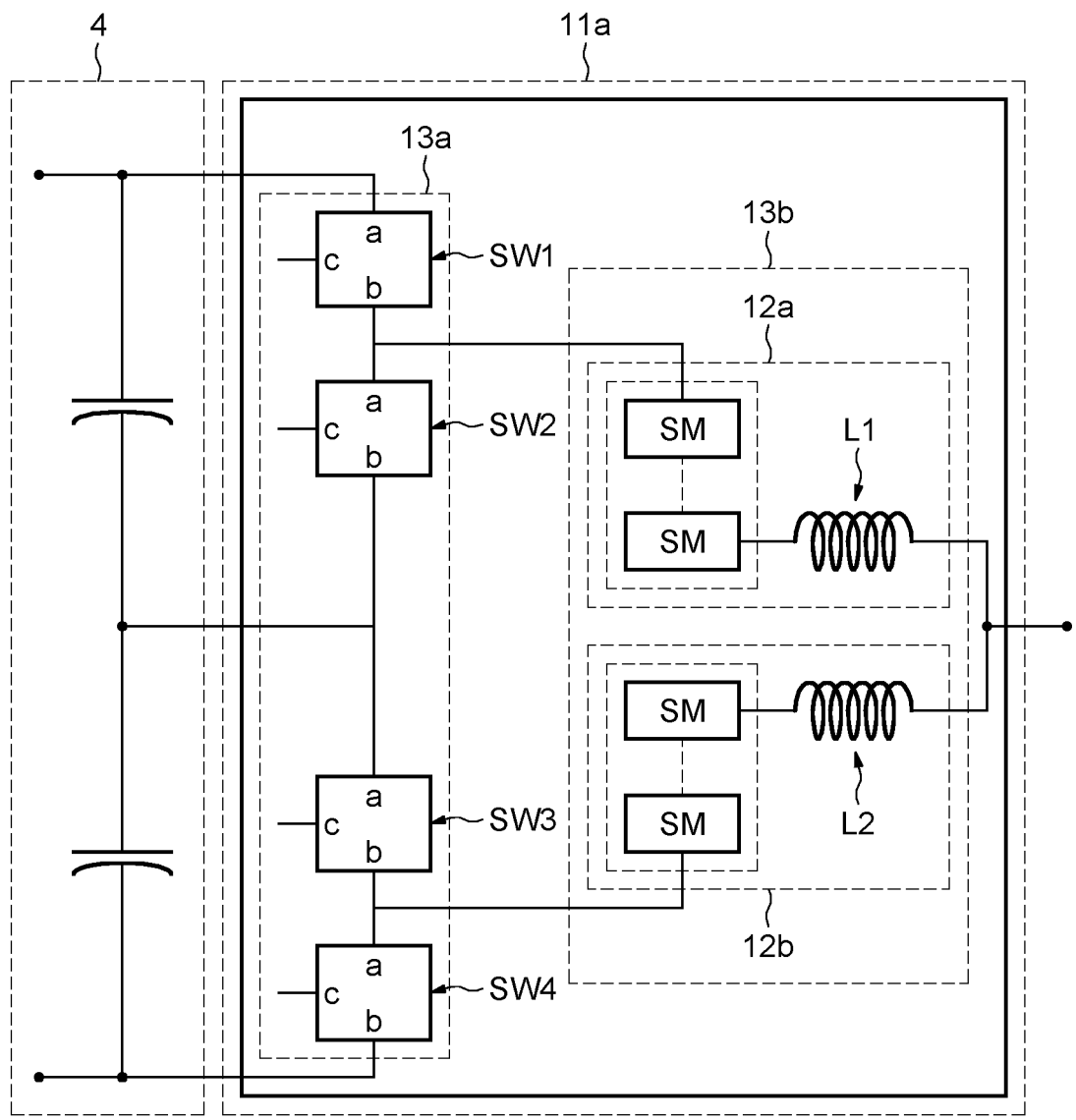
FIG. 5 illustrates a first hybrid modular multilevel converter variant.

A first variant of a hybrid modular multilevel converter is illustrated in FIG. 5. It comprises at least one leg 11a connected to an AC connection and to three DC connections. Each leg 11a comprises a first string 13a comprising at least four controllable switches SW1, SW2, SW3, SW4 of a plurality of controllable switches connected in series and a second string 13b comprising two branches 12a, 12b, each branch 12a, 12b comprising at least one submodule SM of a plurality of submodules (two shown in each branch of 12a or 12b in FIG. 5) and an inductor L1 or L2 in series.

In the present specification, an inductor is to be understood in the broader sense, as an element exhibiting an inductance, or an impedance with an inductance component. The inductance can be either intrinsic or parasitic.

Each controllable switch SW1, SW2, SW3, SW4 comprises a first end, a second end and a control end, respectively labelled a, b and c.

A first controllable switch SW1 is connected by the first end to a first DC connection, and by the second end to the first end of a second controllable switch SW2 and to the second string 13b.

The second end of the second controllable switch SW2 is connected to both a second DC connection and the first end of a third controllable switch SW3. The second end of the third controllable switch SW3 is connected to a first end of fourth controllable switch SW4 and to the second string 13b.

The second end of the fourth controllable switch SW4 is connected to a third DC connection.

The first branch 12a of the second string 13b is connected by a first submodule SM to the first string 13a, in particular to the second end of the first controllable switch SW1 and the first end of the second controllable switch SW2.

The second branch 12b of the second string 13b is connected by a first submodule SM to the first string 13a, in particular to the second end of the third controllable switch SW3 and the first end of the fourth controllable switch SW4.

The first branch 12a and the second branch 12b are connected to the AC connection through their respective inductors L1, L2.

Other embodiments of the first hybrid modular multilevel converter variant comprise a different number of legs. In other words, in other embodiments, a first hybrid modular multilevel converter variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

In each branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, full-bridge submodules or hybrid full-bridge submodules are used in applications where the DC link voltage is less than or equal to the peak/maximum AC phase voltage; or half-bridge submodules are used in applications where the DC link voltage is greater than the peak/maximum AC phase voltage.

Figure 6:
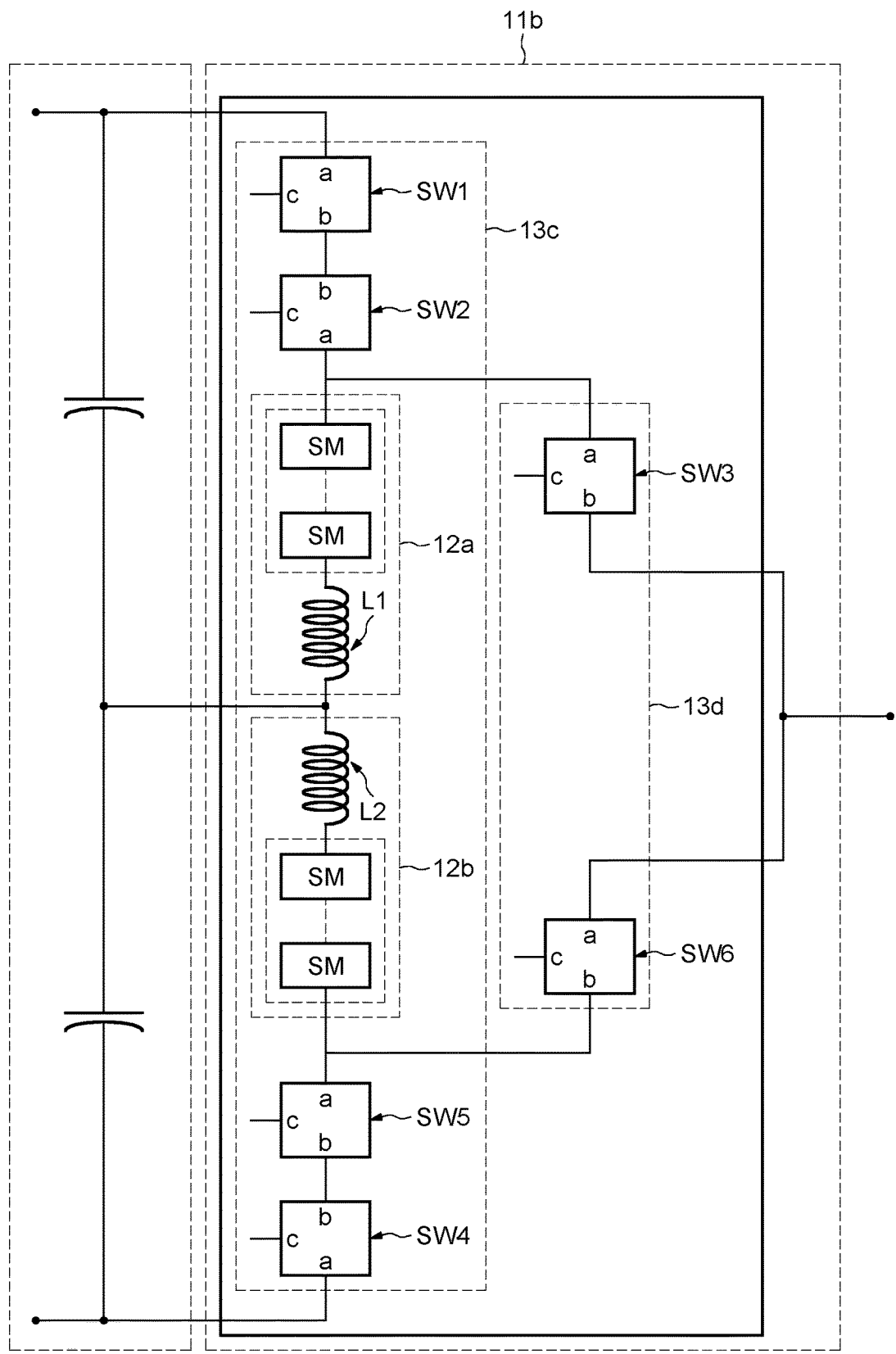
FIG. 6 illustrates a second hybrid modular multilevel converter variant.

A second variant of a hybrid modular multilevel converter is illustrated in FIG. 6. It comprises at least one leg 11b connected to an AC connection and to three DC connections.

Each leg 11b comprises a first string 13c comprising two branches 12a, 12b, each branch comprising at least one submodule SM of a plurality of submodules (two shown in each branch of 12a, 12b in FIG. 6), at least two pairs of controllable switches, SW1, SW2, SW4, SW5 of a plurality of pairs of controllable switches connected in series with opposite polarities, and an inductor L1 or L2 in series, and a second string 13d comprising at least two controllable switches SW3, SW6 of a plurality of controllable switches connected in series in each switch SW3, SW6 location.

Each controllable switch SW1, SW2, SW3, SW4, SW5, SW6 comprises a first end, a second end and a control end, respectively labelled a, b and c.

In the first string 13c, the first end of the first controllable switch SW1 of the first pair of controllable switches is connected to a first DC connection. The second end of the first controllable switch SW1 of the first pair of controllable switches is connected to the second end of the second controllable switch SW2 of the first pair of controllable switches.

The first end of the second controllable switch SW2 of the first pair of controllable switches is connected to a first submodule SM of the first branch 12a and to the second string 13d.

The first end of the fourth controllable switch SW4 of the second pair of controllable switches is connected to a third DC connection. The second end of the fourth controllable switch SW4 of the second pair of controllable switches is connected to the second end of the fifth controllable switch SW5 of the second pair of controllable switches. The first end of the fifth controllable switch SW5 of the second pair of controllable switches is connected to a first submodule SM of the second branch 12b and to the second string 13d.

The inductor L1 of the first branch 12a and the inductor L2 of the second branch 12b are connected together to a second DC connection.

In the second string 13d, the first end of the third controllable switch SW3 is connected to the first string 13c, in particular to the first end of the second controllable switch SW2 of the first pair of controllable switches and to the first submodule SM of the first branch 12a.

The second end of the sixth controllable switch SW6 is connected to the first string 13c, in particular to the first end of the fifth controllable switch SW5 of the second pair of controllable switches and to the first submodule SM of the second branch 12b.

The second end of the third controllable switch SW3 and the first end of the sixth controllable switch SW6 are connected together to an AC connection.

Other embodiments of the second hybrid modular multilevel converter variant comprise a different number of legs. In other words, in other embodiments, a second hybrid modular multilevel converter variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections. In each branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, the submodules SM are half-bridge submodules as illustrated in FIG. 10.

The second HMMC variant is best suited for applications where DC link voltage is less than the instantaneous max supply/source AC phase voltage. The second HMMC variant is also uniquely designed and optimized for lower cost with the fewest number of components/devices counts.

Figure 7:
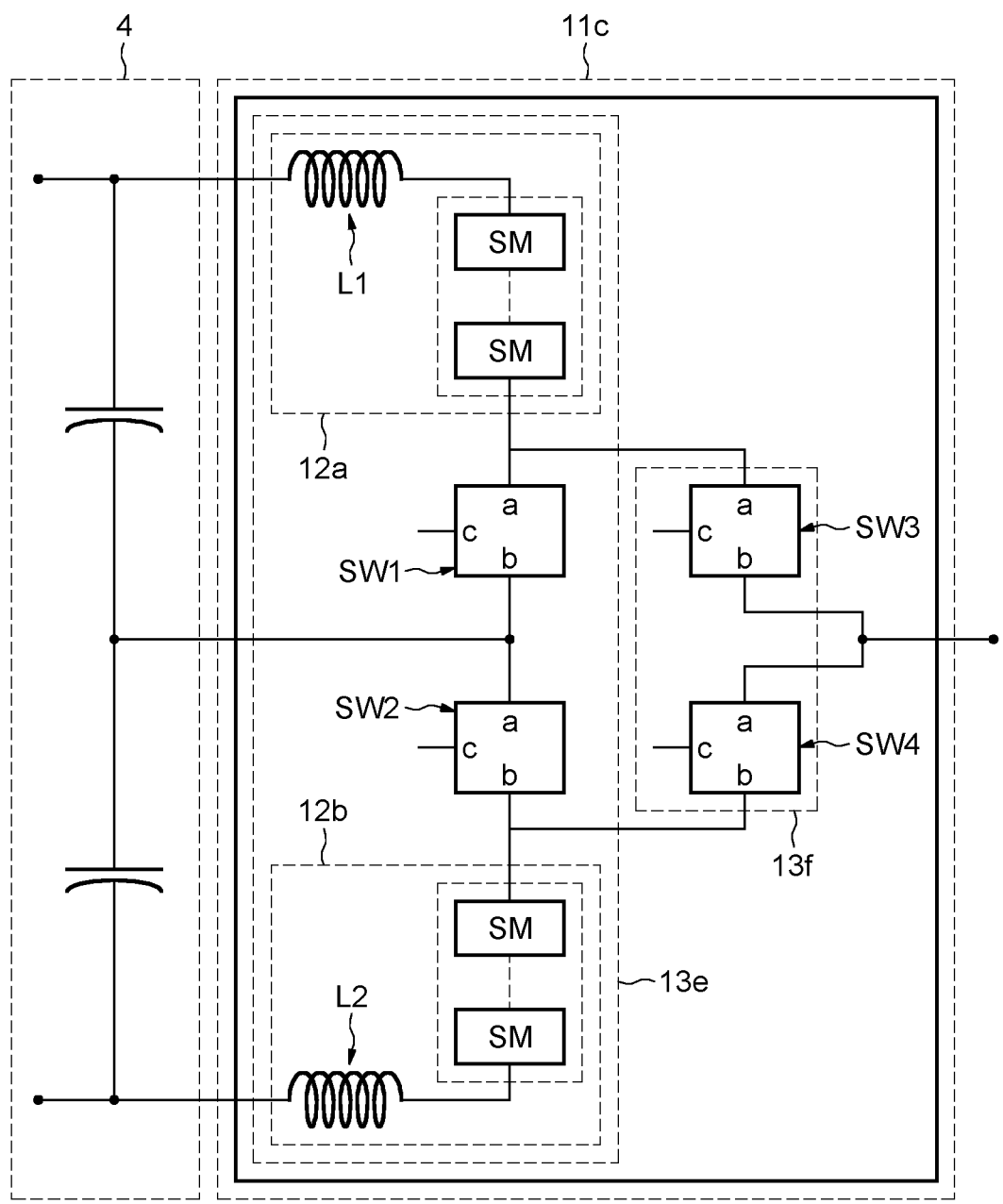
FIG. 7 illustrates a third hybrid modular multilevel converter variant.

A third variant of a hybrid modular multilevel converter is illustrated in FIG. 7. It comprises at least one leg 11c connected to an AC connection and to three DC connections.

Each leg 11c comprises a first string 13e comprising two branches each connected to at least two controllable switches SW1, SW2 of a plurality of controllable switches connected in series and a second string 13f comprising at least of two controllable switches SW3, SW4 of a plurality of controllable switches. Each branch 12a, 12b comprises at least one submodules SM of a plurality of submodules (two shown in each branch of 12a or 12b in FIG. 7) in series and an inductor L1, L2 in each respective branch of 12a or 12b.

In the first string 13e, the first branch 12a is connected to a first DC connection by the first inductor L1. The first branch 12a is connected by a first submodule SM to the first end of a first controllable switch SW1 and to the second string 13f.

Also, in the first string 13e, the second branch 12b is connected to a third DC connection by the second inductor L2. The second branch 12b is connected by a first submodule SM to the second end of a second controllable switch SW2 and to the second string 13f.

Still in the first string 13e, the second end of the first controllable switch SW1 is connected to the first end of the second controllable switch SW2 and to a second DC connection.

The second string 13f comprises at least two controllable switches SW3, SW4 of a plurality of controllable switches connected in series in each switch location SW3, SW4. The first end of the third controllable switch SW3 is connected to the first string 13e, in particular to the first end of first controllable switch SW1 and to the first submodule of the first branch 12a.

The second end of the fourth controllable switch SW4 is connected to the first string 13e, in particular to the second end of second controllable switch SW2 and to the first submodule of the second branch 12b.

The second end of the third controllable switch SW3 and the first end of the fourth controllable switch SW4 are connected to an AC connection.

Other embodiments of the third hybrid modular multilevel converter variant comprise a different number of legs. In other words, in other embodiments, a third hybrid modular multilevel converter variant comprises at least two legs. The first DC connections of the two or multiple legs are connected together, the second DC connections of the two or multiple legs are connected together, and the third DC connections of the two or multiple legs are connected together. The AC connections of the two or multiple legs are independent. They form two or multiple phases of the AC connections.

In either branch 12a, 12b, the submodules SM are full-bridge submodules (as illustrated in FIG. 8), hybrid full-bridge submodules (as illustrated in FIG. 9) or half-bridge submodules (as illustrated in FIG. 10) or any combination thereof.

In a preferred embodiment, full-bridge submodules or hybrid submodules are used in applications where the DC link voltage is less than or equal to the peak/maximum AC phase voltage; or half-bridge submodules are used in applications where the DC link voltage is greater than the peak/maximum AC phase voltage.

The different variants of submodules SM will now be described.

A first submodule variant is built upon controllable switches in a full bridge configuration as illustrated in FIG. 8. It comprises two connections, four controllable switches SW1_SM, SW2_SM, SW3_SM, SW4_SM, and a capacitor C_SM.

Each controllable switch SW1_SM, SW2_SM, SW3_SM, SW4_SM comprises a first end, a second end and a control end, respectively labelled a, b and c.

A first submodule connection is connected to the second end of a first controllable switch SW1_SM and to the first end of a second controllable switch SW2_SM.

A second connection is connected to the second end of the third controllable switch SW3_SM and to the first end of the fourth controllable switch SW4_SM.

A first end of the capacitor C_SM is connected to both first ends of the first controllable switch SW1_SM and third controllable switch SW3_SM. A second end of the capacitor C_SM is connected both second ends of the second controllable switch SW2_SM and fourth controllable switch SW4_SM.

In a second variant, the submodule SM is a hybrid submodule based on two controllable switches in a full bridge configuration with diodes, as illustrated in FIG. 9 instead of four controllable switches in a full bridge configuration.

A hybrid submodule essentially corresponds to a regular submodule wherein the first and fourth controllable switches SW1_SM, SW4_SM are replaced by diodes D1_SM, D4_SM. For the sake of comprehensiveness, FIG. 8 naming scheme is kept. A hybrid submodule comprises two connections, two controllable switches SW2_SM, SW3_SM, two diodes D1_SM, D4_SM and a capacitor C_SM.

A first connection is connected to the first diode D1_SM anode and to a first end of the second controllable switch SW2_SM.

A second connection is connected to the second end of third controllable switch SW3_SM and to the fourth diode D4_SM cathode.

A first connection of the capacitor C_SM is connected on one hand to the first diode D1_SM cathode and to the first end of the third controllable switch SW3_SM. Another connection of the capacitor C_SM is connected to the second end of the second controllable switch SW2_SM and to the fourth diode D4_SM anode.

In a third variant, the submodules SM are controllable switches in a half bridge configuration as illustrated in FIG. 10.

It comprises two connections, two controllable switches SW1_SM, SW2_SM, and a capacitor C_SM. The first connection is connected to the second end of the first controllable switch SW1_SM and to the first end of the second controllable switch SW2_SM. The second connection is connected to the second end of the second controllable switch SW2_SM.

The capacitor C_SM is connected on one hand to the first end of the first controllable switch SW1_SM and on the other hand to both the second connection and the second end of the second controllable switch SW2_SM.

Figure 11:
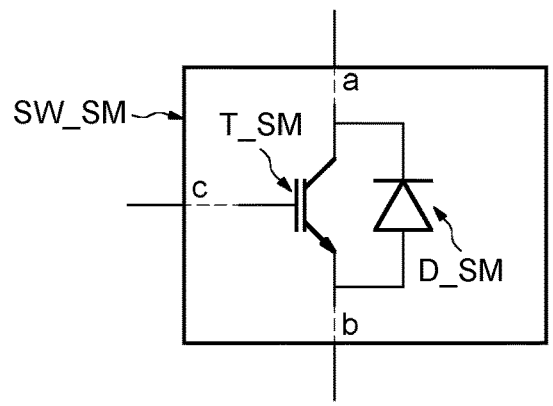
FIG. 11 illustrates a controllable switch based on a bipolar transistor.
Figure 12:
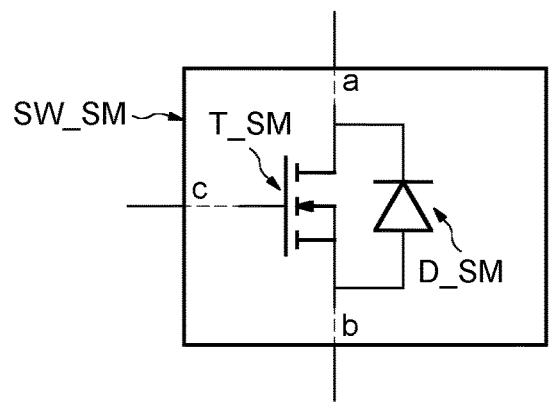
FIG. 12 illustrates a controllable switch based on a MOSFET transistor.

FIG. 11 and FIG. 12 illustrate exemplary embodiments of a controllable switch SW_SM. The controllable switch SW_SM can be any of the controllable switches SW1, SW2, SW3, SW4, SW5, SW6 SW1_SM, SW2_SM, SW3_SM, or SW4_SM comprised in the embodiments described above.

The controllable switch SW_SM comprises a first end, a second end, and a control end, respectively labelled a, b and c. The first end is connected to the collector/source of a bipolar transistor T_SM, the second end being connected to the emitter/drain of said bipolar transistor T_SM. A freewheeling diode D_SM is connected so that its anode is connected to the transistor T_SM drain, its cathode being connected to the transistor T_SM source. The control end is connected to the transistor T_SM gate.

Other embodiments of the controllable switch SW_SM comprise at least two transistors connected in parallel, in series or in a combination of parallel and series.

The transistor T_SM illustrated in FIG. 11 is a bipolar transistor. However, other kinds of transistors can be used, like for example MOSFETs (acronym for "Metal Oxide Silicon Field Effect Transistor") as pictured in FIG. 12, or IEGTs (acronym for "Injection Enhanced Gate Transistor").

Figure 13:
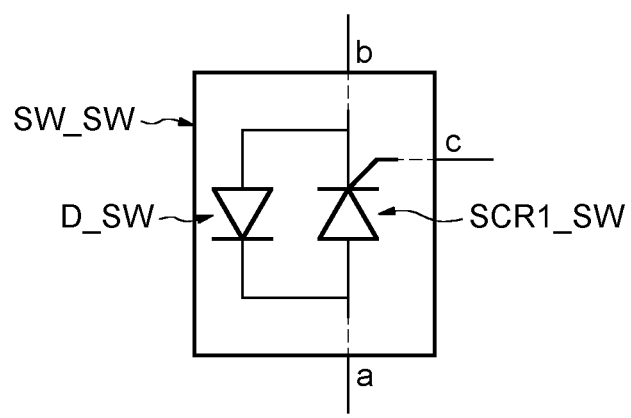
FIG. 13 illustrates a controllable switch based on a silicon-based rectifier.
Figure 14:
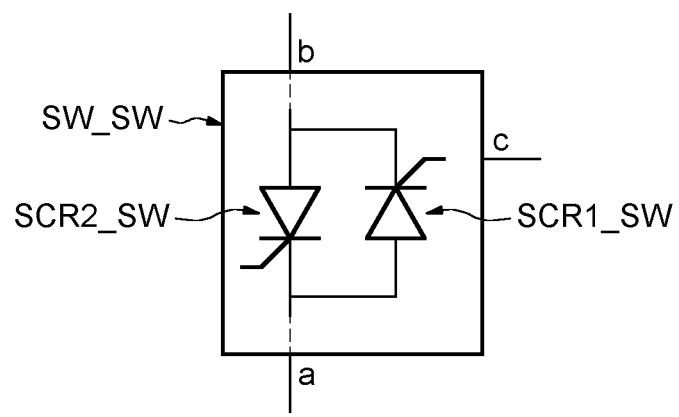
FIG. 14 illustrates a controllable switch based on two silicon-based rectifiers.

FIG. 13 and FIG. 14 illustrate yet other exemplary embodiments of a controllable switch SW_SW. The controllable switch SW_SW can be any of the controllable switches SW1, SW2. SW3, SW4, SW5, SW6 comprised in the embodiments described above.

The controllable switches SW_SW shown in FIG. 13 and FIG. 14 include an SCR (acronym for "silicon-controlled rectifier.") connected to an antiparallel freewheeling diode.

FIG. 13 illustrates a first embodiment of an SCR-based controllable switch SW_SW comprising a silicon-controlled rectifier labelled SCR1_SW and a freewheeling diode D_SW. The first end of the SCR-based controllable switch SW_SW is connected to the anode of the silicon-controlled rectifier SCR1_SW and to the cathode of the freewheeling diode D_SW. The second end of the SCR-based controllable switch SW_SW is connected to the cathode of the SCR SCR1_SW and to the anode of the freewheeling diode D_SW. The control end of the SCR-based controllable switch SW_SW is connected to the gate of the silicon-controlled rectifier SCR1_SW.

FIG. 14 illustrates a second embodiment of an SCR-based controllable switch SW_SW comprising two silicon-controlled rectifiers labelled SCR1_SW and SCR2_SW.

A first end of the SCR-based controllable switch SW_SW is connected to the anode of the first silicon-controlled rectifier SCR1_SW and to the cathode of the second silicon-controlled rectifier SCR2_SW.

The second end of the SCR-based controllable switch SW_SW is connected to the cathode of the first silicon-controlled rectifier SCR1_SW and to the anode of the second silicon-controlled rectifier SCR2_SW.

The control end of the SCR-based controllable switch SW_SW is connected directly or indirectly to the gates of both silicon-controlled rectifier SCR1_SW, SCR2_SW. For instance, one of the silicon-controlled rectifiers can be connected directly while the other is connected through signal processing means. Such signal processing means can be configured to delay a signal by a duration, either a fixed duration or a variable duration, or to trigger the emission of a pulsed width modulated signal upon receiving a command signal. The signal processing means can be configured to generate a command signal based on a multiplexed signal received. Other signal processing means can be used without departing from the scope of the invention.

Figure 15:
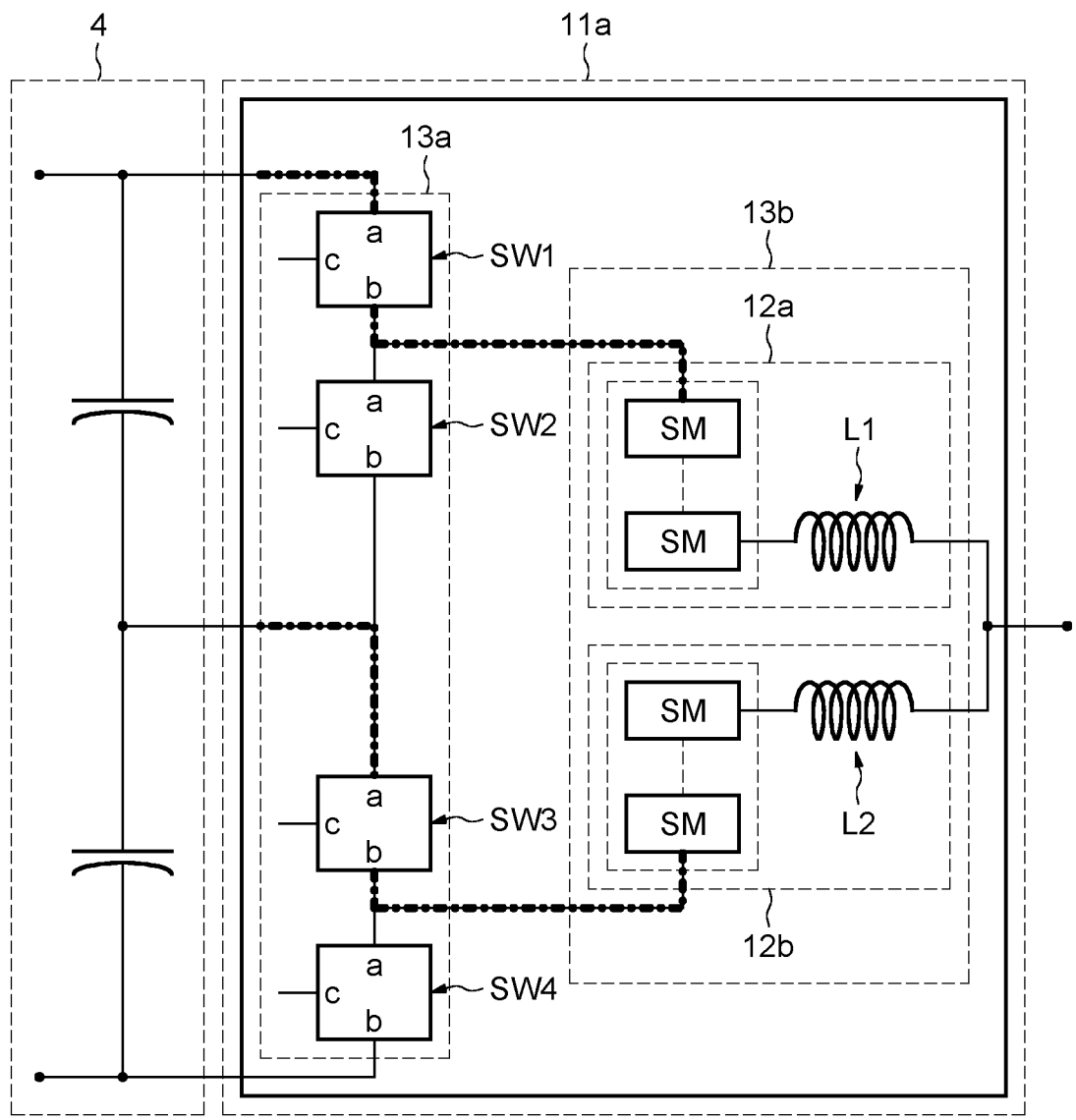
FIG. 15 illustrates the commutation paths in a first hybrid modular multilevel converter variant employed as a motor-end converter and operating at a first voltage in a three-level DC-DC chopper in series with a multi-level MMC DC-AC converter.

In the embodiment illustrated in FIG. 15, a particular control scheme is applied to a leg 11a of the motor-end converter 11 when the motor-end converter is an HMMC according to the first embodiment, illustrated in FIG. 5.

An HMMC generates an AC voltage for powering the motor out of the voltage provided by the DC link through the three DC connections. The first DC connection is at a first-level +Vdc/2 voltage, the second connection at a second-level Vmid=0 voltage, and the third connection being at a third-level −Vdc/2 voltage. By connecting to the three-level voltages with different durations (duty ratios), a first part (the controllable switches SW1, SW2, SW3, SW4) of the motor-end converter 11 acts as a three-level DC/DC converter/chopper. The motor-end converter 11 HMMC is able to switch between those DC connections in order to generate a variable DC voltage which is then converted by the second part (submodules SMs) of the motor-end converter 11 operating in an MMC mode to generate the required AC voltage for the motor 3. A different control scheme is required depending on the DC connections used in generating the AC voltage. The control scheme is applied by commanding the control end of each HMMC controllable switch, through the second controller 5b, illustrated on FIG. 5.

When the DC voltage required to generate the AC voltage is equal to Vdc/2, the motor-end converter 11 is commanded so that the input voltage is generated by connecting the first DC connection Vdc/2 voltage and the second DC connection Vmid voltage. The DC voltage then results in a Vdc/2 voltage between the branches 12a, 12b of the second leg 13b. The "chopped" DC voltage is then converted in an MMC operating mode by the submodules SM comprised in each of the branches 12a, 12b in order to generate the AC voltage fed to the motor 3.

In order to do so, the first controllable switch SW1 and the third controllable switch SW3 are commanded in a conducting ("on") state while the second controllable switch SW2 and the fourth controllable switch SW4 are commanded in a non-conducting can state.

A first conducting path between the first DC connection and the AC connection is then created through the first controllable switch SW1 and the first branch 12a. A second conducting path between the second DC connection and the AC connection is created through the third controllable switch SW3 and the second branch 12b. FIG. 15 illustrates the first conducting path and the second conducting path as lines with a dash-dot pattern.

When the DC voltage required to generate the AC voltage is equal to V=0, the motor-end converter 11 is commanded so that the input voltage is generated by connecting the second DC connection. The second DC connection being at a Vmid=0 voltage. The "chopped" DC voltage is then converted in an MMC operating mode by the submodules SM comprised in each of the branches 12a, 12b in order to generate the AC voltage fed to the motor 3.

Figure 16:
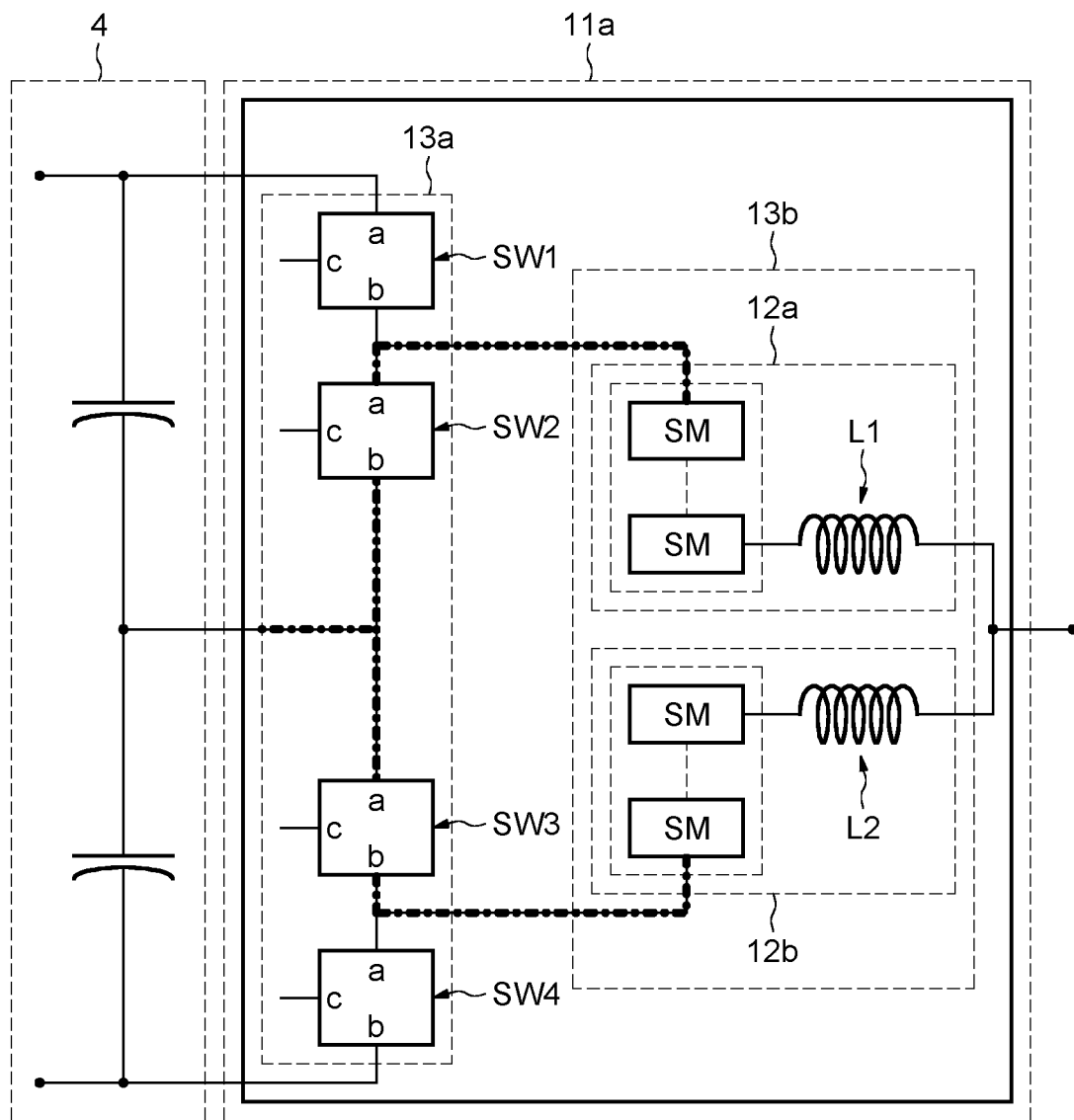
FIG. 16 illustrates the commutation paths in a first hybrid modular multilevel converter variant employed as a motor-end converter and operating at a second voltage in a three-level DC-DC chopper in series with a multi-level MMC DC-AC converter.

In order to do so, the first controllable switch SW1 and the fourth controllable switch SW4 are commanded in a non-conducting ("off") state while the second controllable switch SW2 and the third controllable switch SW3 are commanded in a conducting ("on") state. A first conducting path between the second DC connection and the AC connection is then created through the second controllable switch SW2 and the first branch 12a. A second conducting path between the second DC connection and the AC connection is created through the third controllable switch SW3 and the second branch 12b. FIG. 16 illustrates the first conducting path and the second conducting path as lines with a dash-dot pattern.

When the voltage required to generate the AC voltage is equal −Vdc/2, the motor-end converter 11 is commanded to so that the input voltage is generated by connecting the second DC connection voltage and the third DC connection voltage. The DC voltage then results in a −Vdc/2 voltage between the branches 12a, 12b of the second leg 13b. The "chopped" DC voltage is then converted in an MMC operating mode by the submodules SM comprised in each of the branches 12a, 12b in order to generate the AC voltage fed to the motor 3.

Figure 17:
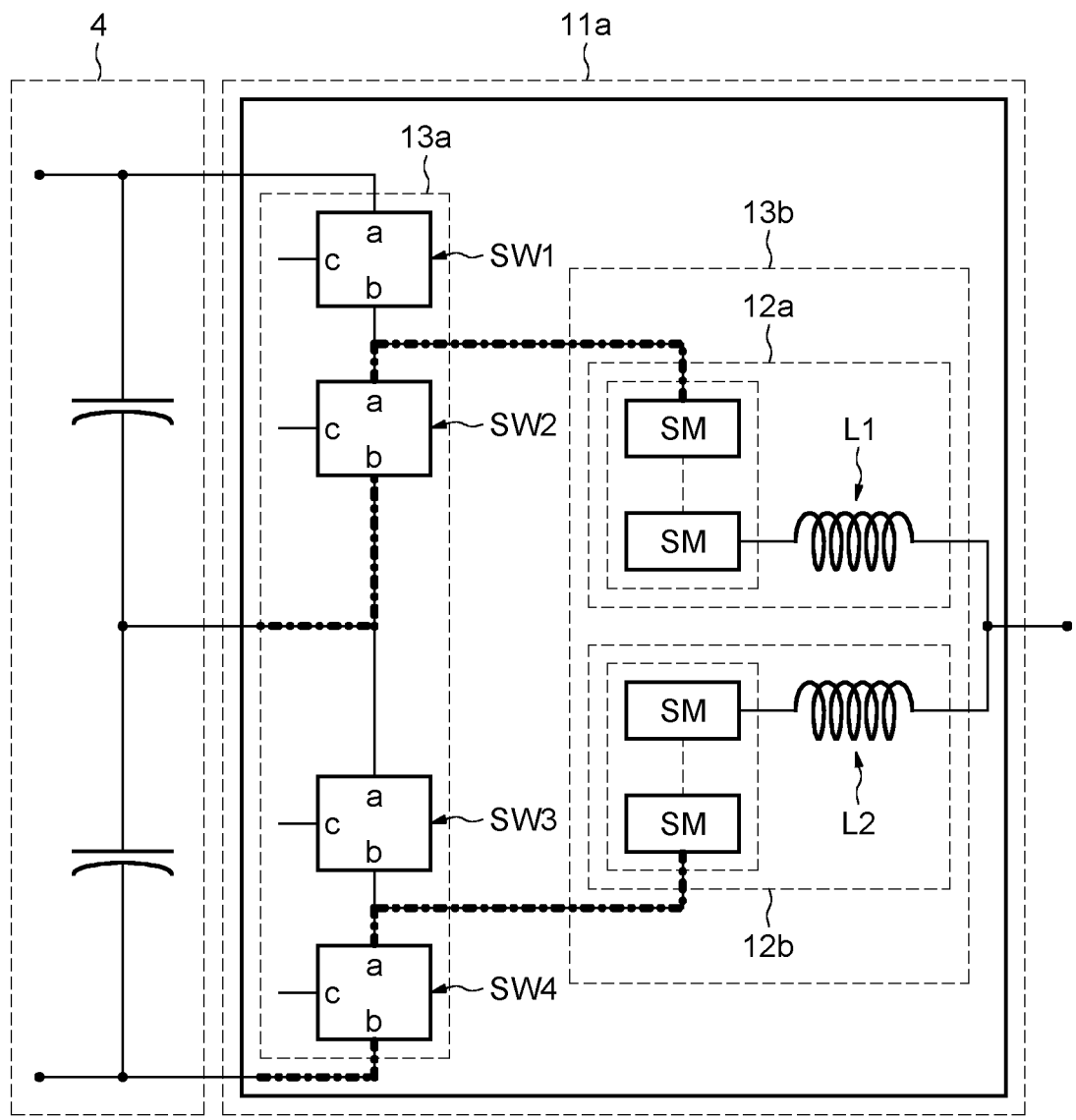
FIG. 17 illustrates the commutation paths in a first hybrid modular multilevel converter variant employed as a motor-end converter and operating at a third voltage in a three-level DC-DC chopper in series with a multi-level MMC DC-AC converter.

In order to do so, the second controllable switch SW2 and the fourth controllable switch SW4 are commanded in a conducting ("on") state while the first transistor controllable switch SW1 and the third controllable switch SW3 are commanded in a non-conducting ("off") state. A first conducting path between the second DC connection and the AC connection is then created through the second controllable switch SW2 and the first branch 12a. A second conducting path between the third DC connection and the AC connection is created through the fourth controllable switch SW4 and the second branch 12b. FIG. 17 illustrates the first conducting path and the second conducting path as lines with a dash-dot pattern.

Depending on the AC voltage to be fed to the motor 3, the motor-end converter is commanded so that one of the three control scheme is applied.

Figure 18:
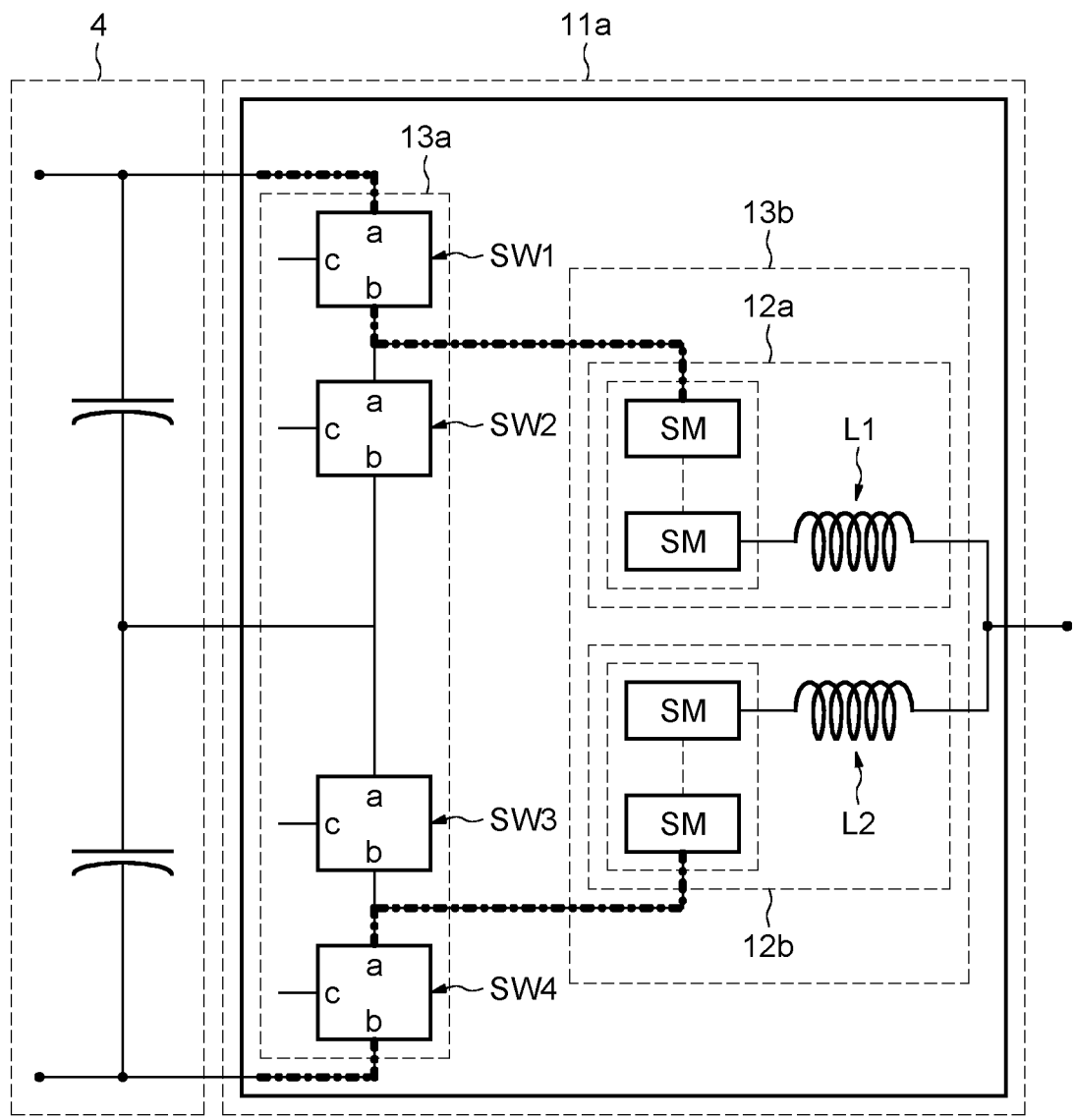
FIG. 18 illustrates the commutation paths in a first hybrid modular multilevel converter variant employed as a motor-end converter and operating at a first voltage in a two-level DC-DC chopper in series with a multi-level MMC DC-AC converter.
Figure 19:
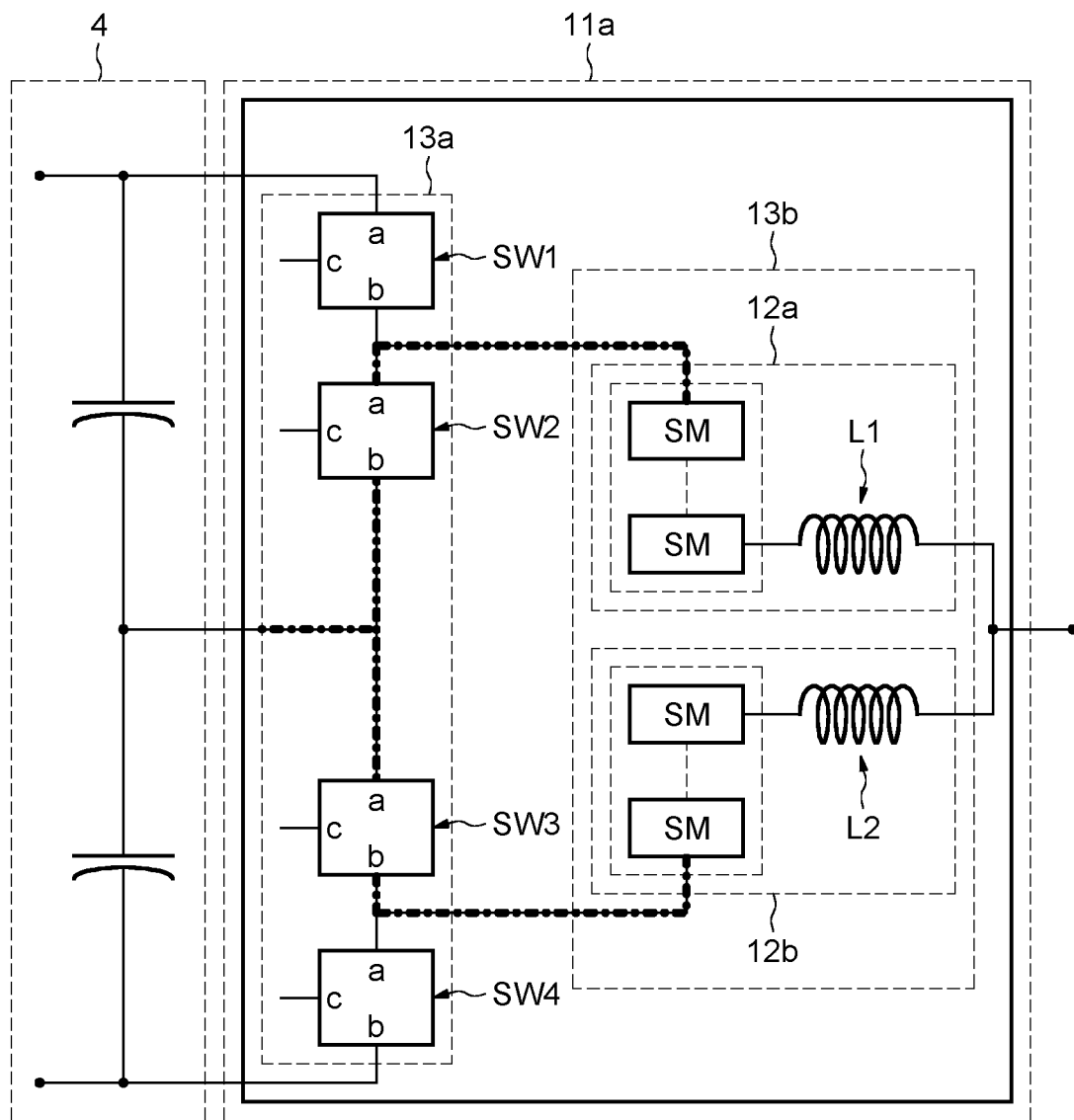
FIG. 19 illustrates the commutation paths in a first hybrid modular multilevel converter variant employed as a motor-end converter and operating at a second voltage in a two-level DC-DC chopper in series with a multi-level MMCDC-AC converter.

In another embodiment illustrated in FIG. 18 and FIG. 19, the motor-end HMMC 11 can operate in a traditional MMC plus a two-level (2L) chopper mode for DC/DC conversion during startup in order to generate a variable DC voltage at the chain link (CL) as seen from the motor side. The chain link (CL) is to be understood as the branches (12a, 12b) in the second string 13b. This is equivalent to variable DC voltage at the CL and constant current through the CL. By varying the DC voltage at the chain link (CL) as seen from the motor and maintaining a constant ratio of VCL/f, the voltage ripple of submodule capacitors will be controlled to a constant value during startup and throughout the entire operating range including non-startup and steady state operation.

An alternate control scheme is applied in order to deliver a variable DC link voltage performing a two-level DC/DC conversion by the controllable switches SW1, SW2, SW3, SW4. The variable DC link voltage is then converted in an MMC operating mode by the submodules SM to generate a required AC voltage fed to the motor 3. The two voltage levels are Vdc and 0. FIG. 18 and FIG. 19 illustrate the different conducting paths for achieving the two voltage levels when the motor-end (ME) HMMC operates in an MMC plus 2L DC/DC chopper mode.

When the DC voltage required to generate the AC voltage is equal to Vdc, the motor-end converter 11 is commanded to connect the third DC connection −Vdc/2 voltage and the first DC connection Vdc/2 voltage. The DC voltage then results in a Vdc voltage across the CL branches 12a, 12b.

In order to do so, the first controllable switch SW1 and the fourth controllable switch SW4 are commanded in a conducting ("on") state while the second controllable switch SW2 and the third controllable switch SW3 are commanded in a non-conducting ("off") state. A first conducting path is then created through the first controllable switch SW1 and the first branch 12a. A second conducting path is created through the fourth controllable switch SW4 and the second branch 12b. FIG. 18 illustrates the two conducting paths as lines with a dash-dot pattern.

When the DC voltage required to generate the AC voltage is equal to V=0, the motor-end converter 11 is commanded to connect the second Vmid connection through two different paths.

In order to do so, the first controllable switch SW1 and the fourth controllable switch SW4 are commanded in a non-conducting ("off") state while the second controllable switch SW2 and the third controllable switch SW3 are commanded in a conducting ("on") state. A first conducting path is then created through the second controllable switch SW2 and the first branch 12a. A second conducting path is created through the third controllable switch SW3 and the second branch 12b. FIG. 19 illustrates the first conducting path and the second conducting path as lines with a dash-dot pattern.

The AC-DC-AC converter as described above is advantageous, thanks to its ability to overcome MMCs large voltage ripple at low frequency during motor startup, in particular for drive applications. It is able to provide a small and constant capacitor voltage ripple at low frequency, during motor startup.

It is also advantageous, thanks to its compactness, both in volume and footprint along with a reduced weight while offering a higher power density with less losses (higher efficiency than the offering of the previous art).

As an HMMR is used as a front-end converter, the AC-DC-AC converter also provides a constant DC link voltage generated and maintained by the front-end converter and a variable chain link DC voltage generated by the motor-end HMMC converter operating in MMC plus DC/DC chopper mode. The variable chain link DC voltage is proportional to motor speed or frequency with a constant DC current during low frequency motor startup operations.

The invention claimed is:

1. An AC-DC-AC converter for delivering power to an electric motor from a power source, the AC-DC-AC converter comprising a front-end converter and a motor-end converter connected through a DC link, the front-end converter operating so that the DC link voltage is constant, wherein the front-end converter is a hybrid modular multilevel rectifier, the motor-end converter being a hybrid modular multilevel converter or a modular multilevel converter.

2. The AC-DC-AC converter according to claim 1, wherein the hybrid modular multilevel rectifier comprises at least one leg, each leg being connected to an AC connection and to three DC connections, each leg comprises at least four diodes of a plurality of diodes and two branches, the first branch comprising at least one submodule of a plurality of submodules connected in series, the first branch being connected to a first diode anode and to a second diode cathode by a first submodule and to the AC connection, the second branch comprising at least one submodule of a plurality of submodules connected in series, the second branch being connected to the third diode anode and to the fourth diode cathode by a first submodule and to the AC connection, the first diode cathode being connected to the first DC connection, the second diode anode and the third diode cathode being connected to the second DC connection, the fourth diode anode being connected to the third DC connection.

3. The AC-DC-AC converter according claim 2, wherein each branch comprises an inductor connected on one-end in series with the submodules of the respective branch, and on the-other-end to the AC connection, the second DC connection and the diodes the branch is connected to respectively.

4. The AC-DC-AC converter according to claim 2, wherein the hybrid modular multilevel rectifier comprises at least two legs, the first DC connections of the at least two legs being connected together, the second DC connections of the at least two legs being connected together, and the third DC connections of the at least two legs being connected together, the AC connections of the at least two legs are independent and forming at least two phases of the AC connections.

5. The AC-DC-AC converter according to claim 2, wherein all the submodules are half-bridge submodules and/or full-bridge submodules.

6. The AC-DC-AC converter according to claim 5, wherein a half-bridge submodule comprises a first connection connected to a second end of a first controllable switch and to a first end of a second controllable switch, a second connection connected to the second end of the second controllable switch, a capacitor connected on one hand to the first end of the first controllable switch and on another hand to both the second connection and the second end of the second controllable switch.

7. The AC-DC-AC converter according to claim 5, wherein a full-bridge submodule comprises a first connection connected to a second end of a first controllable switch and to a first end of a second controllable switch, a second connection is connected to a second end of a third controllable switch and to a first end of a fourth controllable switch, a capacitor being connected on one hand to both first ends of the first controllable switch and third controllable switch, and on another hand to both second ends of the second controllable switch and fourth controllable switch.

8. The AC-DC-AC converter according to claim 6, wherein a controllable switch comprises at least a transistor and a freewheeling diode, the transistor source and the freewheeling diode cathode being connected to the first end of the controllable switch, the transistor drain and the freewheeling diode anode being connected to the second end of the controllable switch, the transistor gate being connected to the control end of the controllable switch.

9. The AC-DC-AC converter according to claim 8, wherein a transistor is an insulated-gate bipolar transistor, an injection-enhanced gate transistor, notably Si-based or a metal-oxide-semiconductor field-effect transistors, notably SiC-based.

10. The AC-DC-AC converter according to claim 2, wherein a submodule is a half-bridge submodule, a full-bridge submodule or a hybrid full-bridge submodule.

11. The AC-DC-AC converter according to claim 10, wherein a hybrid full-bridge submodule comprises a first connection connected to the first diode anode and to a first end of a second controllable switch, a second connection connected to a second end of the third controllable switch and to the fourth diode cathode, a capacitor connected on one hand to the first diode cathode and to the first end of the third controllable switch, and on another hand to the second end of the second controllable switch and to the fourth diode anode.

12. The AC-DC-AC converter according to claim 10, wherein each controllable switch includes a silicon-controlled rectifier and an antiparallel freewheeling diode or each controllable switch includes a silicon-controlled rectifier and an antiparallel silicon-controlled rectifier.

13. The AC-DC-AC converter according to claim 1, wherein the hybrid modular multilevel rectifier comprises at least one leg, each leg being connected to an AC connection and to three DC connections, each leg comprises at least four diodes of a plurality of diodes and two branches, each branch comprising at least one submodule of a plurality of submodules connected in series, the AC connection being connected to a first diode anode and to a second diode cathode, the first branch comprising at least one submodule of a plurality of submodules connected in series, the first branch being connected by a submodule to the first diode cathode and to a third diode anode, the second branch comprising at least one submodule of a plurality of submodules connected in series, the second branch being connected by a submodule to a second diode anode and to a fourth diode cathode, the third diode cathode being connected to the first DC connection, the first branch and the second branch being connected to the second DC connection, the fourth diode anode being connected to the third DC connection.

14. The AC-DC-AC converter according to claim 1, wherein the hybrid modular multilevel rectifier comprises at least one leg, each leg being connected to an AC connection and to three DC connections, each leg comprises at least four diodes of a plurality of diodes and two branches, each branch comprising at least one submodules of a plurality of submodules connected in series, the AC connection is connected to a first diode anode and to a second diode cathode, the first branch comprises at least one submodule of a plurality of submodules connected in series, the first branch is connected by a submodule to the first DC connection and to the cathodes of the first diode and a third diode, the second branch comprises at least one submodule of a plurality of submodules connected in series, the second branch being connected by a submodule to the third DC connection and to the anodes of the second diode and a fourth diode, the third diode anode and the fourth diode cathode are connected to the second DC connection.

15. The AC-DC-AC converter according to claim 14, wherein all the submodules are full-bridge submodules.

16. The AC-DC-AC converter according to claim 1, wherein the hybrid modular multilevel converter comprises at least one leg, each leg being connected to an AC connection and to three DC connections, each leg comprising at least four controllable switches of a plurality of controllable switches connected in series and two branches, a first end of a first controllable switch connected to a first DC connection, a first end of a second controllable switch connected to a second end of the first controllable switch, the second end of the second controllable switch connected to a second DC connection, a first end of a third controllable switch connected to a second end of the second controllable switch and to the second DC connection, a first end of a fourth controllable switch connected to a second end of the third controllable switch, a second end of the fourth controllable switch is connected to the third DC connection, the first branch comprising at least one submodule of a plurality of submodules connected in series, the first branch being connected by a first submodule (SM) to a second end of the first controllable switch and to a first end of the second controllable switch, the first branch being connected to the AC connection, the second branch comprising at least one submodule a plurality of submodules connected in series, the second branch being connected by a first submodule to a second end of the third controllable switch and to a first end of the fourth controllable switch, the second branch being connected to the AC connection.

17. The AC-DC-AC converter according to claim 16, wherein each branch comprises an inductor connected on one-end in series with the submodules in series in each respective branch, and the other-end to the AC connection, the second DC connection, and to the first and third DC connections respectively.

18. The AC-DC-AC converter according to claim 16, wherein the hybrid modular multilevel converter comprises at least two legs, the first DC connections of the at least two legs being connected together, the second DC connections of the at least two legs being connected together, and the third DC connections of the at least two legs being connected together, the AC connections of the at least two legs being independent and forming two or multiple phases of the AC connections.

19. The AC-DC-AC converter according to claim 16, wherein all the submodules are full-bridge submodules or hybrid full-bridge submodules.

20. The AC-DC-AC converter according to claim 1, wherein the hybrid modular multilevel converter comprises at least one leg, each leg being connected to an AC connection and to three DC connections, each leg comprising at least two pairs of controllable switches of a plurality of pairs of controllable switches connected in series with opposite polarities and at least two controllable switches of a plurality of controllable switches connected in series, a first end of a first controllable switch of the first pair of controllable switches connected to a first DC connection, a second end of a second controllable switch of the first pair of controllable switches is connected to the second end of the first controllable switch of the first pair of controllable switches, a first end of a third controllable switch is connected to the first end of the second controllable switch of the first pair of controllable switches, the second end of the third controllable switch is connected to the AC connection, a first end of a fourth controllable switch of the second pair of controllable switches is connected to a third DC connection, a second end of a fifth controllable switch of the second pair of controllable switches is connected to a second end of the fourth controllable switch of the second pair of controllable switches, a second end of a sixth controllable switch is connected to the first end of the fifth controllable switch of the second pair of controllable switches, a first end of the sixth controllable switch is connected to the AC connection, the first branch comprising at least one submodule of a plurality of submodules connected in series, the first branch being connected by a first submodule to the first end of the second controllable switch of the first pair of controllable switches and to the first end of the third controllable switch, the first branch being connected to the second DC connection, the second branch comprising at least one submodule of a plurality of submodules connected in series, the second branch being connected by a first submodule to the first end of the fifth controllable switch of the second pair of controllable switches and to the second end of the sixth controllable switch, the second branch being connected to the second DC connection.

21. The AC-DC-AC converter according to claim 20, wherein all the submodules are half-bridge submodules.

22. The AC-DC-AC converter according to claim 1, wherein the hybrid modular multilevel converter comprises at least one leg, each leg being connected to an AC connection and to three DC connections, each leg comprises at least four controllable switches of a plurality of switches connected in series and two branches, a first branch comprising at least one submodule of a plurality of submodules connected in series, the first branch being connected to the first DC connection, a first submodule of the first branch being connected to a first end of a first controllable switch and to a first end of a third controllable switch, a second branch comprising at least one submodule of a plurality of submodules connected in series, the second branch being connected to the third DC connection, a first submodule of the second branch being connected to the second end of the second controllable switch and to the second end of the fourth controllable switch, the second end of the first controllable switch and the first end of the second controllable switch being connected to the second DC connection, the second end of the third controllable switch and the first end of the fourth controllable switch being connected to the AC connection.

23. An AC-DC-AC converter for delivering power to an electric motor from a power source, the AC-DC-AC converter comprising a front-end converter and a motor-end converter connected through a DC link, the front-end converter being a hybrid modular multilevel rectifier, the motor-end converter being a hybrid multilevel converter, the hybrid modular multilevel rectifier operating so that the DC link voltage is constant, the motor-end converter operating in a modular multilevel converter mode with a DC/DC chopper mode during the motor startup.

24. The AC-DC-AC converter according to claim 23, wherein the hybrid modular multilevel converter is operating as a modular multilevel converter with a three-level DC/DC chopper mode provides variable DC voltage at the modular multilevel converter chain link.

25. The AC-DC-AC converter according to claim 23, wherein the hybrid modular multilevel converter is operating as a modular multilevel converter with a two-level DC/DC chopper mode provides variable DC voltage at the modular multilevel converter chain link.

26. The AC-DC-AC converter according to claim 23, wherein the chain link DC voltage is controlled as a function of the motor frequency.

27. The AC-DC-AC converter according to claim 23, wherein the chain link DC voltage is controlled as a function of the motor speed.

28. The AC-DC-AC converter according to claim 23, wherein the chain link DC voltage is controlled as a function of the motor AC voltage.

29. The AC-DC-AC converter according to claim 23, wherein the motor-end hybrid modular multilevel converter operates in a normal hybrid modular multilevel converter mode when the motor is in a non-startup and steady state operation.

\* \* \* \* \*